(12) United States Patent
Tamizkar

(10) Patent No.: US 12,463,898 B2
(45) Date of Patent: Nov. 4, 2025

(54) METHODS AND DEVICES FOR SWITCHING DATA FRAMES IN A COMMUNICATION NETWORK

(71) Applicant: Telia Company AB, Solna (SE)

(72) Inventor: Babak Tamizkar, Stockholm (SE)

(73) Assignee: Telia Company AB (SE)

( * ) Notice: Subject to any disclaimer, the term of this patent is extended or adjusted under 35 U.S.C. 154(b) by 13 days.

(21) Appl. No.: 18/658,250

(22) Filed: May 8, 2024

(65) Prior Publication Data

US 2024/0380693 A1 Nov. 14, 2024

(30) Foreign Application Priority Data

May 9, 2023 (SE) .................... 2350573-8

(51) Int. Cl.
*G06F 15/16* (2006.01)
*H04L 45/00* (2022.01)

(52) U.S. Cl.
CPC .............. *H04L 45/72* (2013.01); *H04L 45/32* (2013.01); *H04L 45/66* (2013.01)

(58) Field of Classification Search
None
See application file for complete search history.

(56) References Cited

U.S. PATENT DOCUMENTS

| 2007/0201490 A1 | 8/2007 | Mahamuni |
| 2007/0288653 A1 | 12/2007 | Sargor et al. |
| 2008/0008182 A1 | 1/2008 | Deng |
| 2008/0181243 A1 | 7/2008 | Vobbilisetty et al. |
| 2010/0278185 A1 | 11/2010 | Jarredal |
| 2011/0007741 A1 | 1/2011 | Kreeger et al. |
| 2011/0292206 A1* | 12/2011 | Newton .............. H04L 61/5014 348/143 |
| 2012/0044837 A1* | 2/2012 | Ibanez Fernandez .. H04L 45/02 370/256 |

(Continued)

FOREIGN PATENT DOCUMENTS

EP 3 855 685 A1 7/2021

OTHER PUBLICATIONS

European Patent Application No. 24173815, European Search Report, Sep. 19, 2024.

(Continued)

*Primary Examiner* — Phuoc H Nguyen
(74) *Attorney, Agent, or Firm* — Burr & Forman LLP; Nathaniel T. Quirk, Esq.

(57) ABSTRACT

A method for switching data frames performed by a source switch device may include receiving a data frame, including source and destination MAC addresses, and modifying a part of the source MAC address with a switch ID of the source switch device, a port number from which the data frame is received, and a reference number representing the part of the source MAC address. The method may also include including the reference number and the part of the source MAC address in a table in the switch device or generating the table and including an entry with the reference number and the part of the source MAC address in the table. The method may also include forwarding or flooding the modified data frame to at least one switch device of the plurality of switch devices.

15 Claims, 9 Drawing Sheets

(56) References Cited

U.S. PATENT DOCUMENTS

| | | | | |
|---|---|---|---|---|
| 2013/0145045 | A1* | 6/2013 | Eastlake, III | H04L 61/25 |
| | | | | 709/245 |
| 2013/0259050 | A1* | 10/2013 | Eastlake, III | H04L 45/66 |
| | | | | 370/392 |
| 2014/0078886 | A1* | 3/2014 | Shukla | H04L 45/66 |
| | | | | 370/218 |
| 2017/0005921 | A1* | 1/2017 | Liu | H04L 45/22 |
| 2019/0260671 | A1* | 8/2019 | Caird | H04L 45/66 |
| 2020/0195582 | A1* | 6/2020 | Marks | H04L 49/25 |
| 2020/0213270 | A1* | 7/2020 | Wentink | H04L 61/5046 |
| 2024/0267329 | A1* | 8/2024 | Neumann | H04L 45/76 |
| 2025/0088389 | A1* | 3/2025 | Tamizkar | H04L 45/745 |

OTHER PUBLICATIONS

Scott M. et al. Addressing the Scalability of Ethernet with MOOSE Draft-Malc-Armd-Moose-00, Oct. 18, 2010.

Swedish Search Report, Nov. 24, 2023, Patent Application No. 2350573-8, Swedish Patent and Registration Office.

Addressing the Scalability of Ethernet with MOOSE, Malcolm Scott, Daniel Wagner-Hall, Andrew Moore and Jon Crowcroft, University of Cambridge Computer Laboratory.

* cited by examiner

100

METHODS AND DEVICES FOR SWITCHING DATA FRAMES IN A COMMUNICATION NETWORK

TECHNICAL FIELD

The present disclosure relates to the field of data communications, and in particular to methods and devices for switching data frames in a communications network.

BACKGROUND

Switching is an approach of delivering data frames across the network, which is described in Layer 2 (L2), i.e., Data Link Layer of an Open Systems Interconnection (OSI) model. Switching methods decide how a switch device receives, processes, and forwards or floods the data frames.

A data frame may variously be referred to as an ethernet frame, a frame, and the like. A data frame starts with a header, which includes the source and destination Medium or Media Access Control (MAC) addresses, data type, among other data. The middle part of the data frame is the actual data. A data frame ends with a field called Frame Check Sequence (FCS). The data/ethernet frame structure is defined in the IEEE 802.3 standard.

A switch device may also be referred to as a switch. A switch device is capable of reading data frames. When a data frame enters into a port of the switch device, the switch device checks FCS field of the data frame and processes the data frame only when it is valid. All invalid data frames are automatically dropped. All valid data frames are processed and sent further to their destination MAC address.

The main tasks of a switch device are the following:
Learn where devices are located and store their locations (i.e., MAC addresses) in a MAC table.
Forward a data frame intelligently based on a MAC address of the data frame.
Remove Layer 2 switching loops.

To make accurate forwarding and filtering decisions, a switch device learns and stores MAC addresses of all connected devices. The switch device stores the learned MAC addresses in a table that is known as a MAC address table or a Content Addressable Memory (CAM) table. When a switch device receives a data frame, it associates the MAC address of the sending device with a switch port on which it was received.

Typically, a Layer two switching uses the following terms:
Flooding: Forwarding a data frame by a switch device on all its ports except the port that the data frame arrives at.
Broadcast frame: A data frame with FF:FF:FF:FF:FF:FF (i.e., hexadecimal format) as its destination MAC address. This address does not point to any specific host node. If a switch device receives a broadcast frame, it floods the frame. A broadcast frame may also be referred to as a broadcast message.
Unicast frame: A data frame with a specific destination MAC address pointing to a specific node. A unicast frame may also be referred to as a unicast message.
Known Unicast frame: A unicast frame for which a switch device has an entry in its MAC address table for the unicast frame's destination MAC address.
Unknown Unicast frame: A unicast frame for which a switch device does not have an entry in its MAC address table for the unicast frame's destination MAC address.

Two main challenges for switching in a Layer 2 domain are MAC address learning and broadcasting.

A first challenge is that each switch device, especially each transit switch device (i.e., a switch device that is not directly connected to a node), needs to learn MAC address for almost all the nodes communicating through the switch device. In mid to large-size networks with hundreds or thousands of nodes, a switch device needs to have a big MAC address table for registering the MAC address of any nodes whose data frames pass through the switch device. This challenge is particularly remarkable for transit switches, because almost all the traffic between all nodes passes through these transit switches. This can consume resources at a switch device and bring latency to the network due to computation overhead of registering new MAC addresses and searching for a MAC address in a large MAC address table.

A second challenge is broadcasting. Broadcasting is not just for a broadcast frame. For example, if a switch device receives a unicast frame but does not have any entry for the destination MAC address of the unicast frame in its MAC address table, the switch has to broadcast (i.e., flood) the unicast frame. This is common when a switch device does not have an entry for an arrived unicast frame. It may be because each switch device's MAC address table has limitation for registering MAC address entries. A switch device may not be able to keep MAC addresses for all connected nodes in the network. When its MAC address table gets full, the switch device starts to replace new entries with old ones. In addition, each entry in the switch device's MAC address table has a timer. The switch device only keeps an entry in its MAC address table for a certain period of time, and after that, the switch device removes that entry from its MAC address table. Broadcasting can lead to latency, more bandwidth utilization, and more usage of switch resources in the network.

In view of the above, there is a need for methods and devices for switching frames in a communications network that solve at least some of the problems described above.

SUMMARY

It is therefore an object of embodiments herein to solve the above problems by providing methods and switch devices.

According to a first aspect of embodiments herein, there is provided a method performed by a source switch device for switching data frames in a communications network comprising a plurality of switch devices including the source switch device; the source switch device being provided with a switch identity (switch ID); the method comprising:
receiving a data frame from a source host node that is connected to the source switch device, wherein the data frame includes a source Media Access Control (MAC) address of the source host node and a destination MAC address;
modifying a part of the source MAC address in the received data frame with information comprising: the switch ID, a port number indicating a port of the source switch device from which the data frame is received, and a reference number representing the part of the source MAC address in the received data frame;
determining if there is a table in the source switch device;
if it is determined that there is a table in the source switch device, and if the table in the source switch device does not include the reference number and the part of the source MAC address;

including the reference number and the part of the source MAC address in an entry of the table;

if it is determined that there is no table in the source switch device,
  generating a table and including in an entry of the generated table, the reference number, and the part of the source MAC address; and forwarding or flooding, towards a destination host node, the modified data frame to at least one switch device of the plurality of switch devices.

According to a second aspect of embodiments herein, there is provided a method performed by a transit switch device, for switching data frames in a communications network comprising a plurality of switch devices including the transit switch device; the method comprising:

receiving a modified data frame from a source switch device, wherein the modified data frame is modified from a data frame including a source Media Access Control, MAC, address of a source host node, and a destination MAC address, by modifying a part of the source MAC address in the data frame with information comprising: a switch ID, a port number indicating a port of the source switch device from which the data frame is received, and a reference number representing the part of the source MAC address in the data frame;

fetching from the part of the source MAC address of the received modified data frame, the switch ID;

determining if there is a switch table in the transit switch device;

if it is determined that there is no switch table in the transit switch device;
  generating a switch table, and including in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received,
  including in the switch table the fetched switch ID and the port number indicating the port of the transit switch device from which the modified data frame is received; and forwarding or flooding, towards a destination host node, the modified data frame to at least one switch device of the plurality of switch devices.

According to a third aspect of embodiments herein, there is provided a method performed by a destination switch device for switching data frames in a communications network comprising a plurality of switch devices including the destination switch device, the method comprising:

receiving a modified data frame from a transit switch device, wherein the modified data frame is modified from a data frame including a source Media Access Control, MAC, address of a source host node, and a destination MAC address, by modifying a part of the source MAC address in the data frame with information comprising: a switch ID, a port number indicating a port of a source switch device from which the data frame is received, and a reference number representing the part of the source MAC address in the data frame;

fetching from the part of the source MAC address of the received modified data frame, the switch ID;

determining if there is a switch table in the destination switch device;

if it is determined that there is no switch table in the destinations switch device,
  generating a switch table, and including in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received;
  including in the switch table the fetched switch ID and the port number indicating the port of the destination switch device from which the modified data frame is received; and forwarding or flooding the received modified data frame to at least a destination host node device that is connected to the destination switch device.

According to a fourth aspect of embodiments herein, there is provided a source switch device for switching data frames in a communications network comprising a plurality of switch devices including the source switch device, wherein the source switch device comprises a processor and a memory, said memory containing instructions executable by said processor whereby said source switch device is operative to:

receive a data frame from a source host node that is connected to the source switch device, wherein the data frame includes a source Media Access Control, MAC, address of the source host node, and a destination MAC address;

modify a part of the source MAC address in the received data frame with information comprising: the switch ID, a port number indicating a port of the source switch device from which the data frame is received, and a reference number representing the part of the source MAC address in the received data frame;

determine if there is a table in the source switch device;

if it is determined that there is a table in the source switch device, and if the table in the source switch device does not include the reference number and the part of the source MAC address;

include the reference number and the part of the source MAC address in an entry of the table;

if it is determined that there is no table in the source switch device;
  generate a table and including in an entry of the generated table, the reference number, and the part of the source MAC address; and forward or flood, towards a destination host node, the modified data frame to at least one switch device of the plurality of switch devices.

According to a fifth aspect of embodiments herein, there is also provided a transit switch device for switching data frames in a communications network comprising a plurality of switch devices including the transit switch device, wherein the transit switch device comprises a processor and a memory, said memory containing instructions executable by said processor whereby said transit switch device is operative to:

receive a modified data frame from a source switch device, wherein the modified data frame is modified from a data frame including a source Media Access Control, MAC, address of a source host node, and a destination MAC address, by modifying a part of the source MAC address in the data frame with information comprising: a switch ID, a port number indicating a port of the source switch device from which the data frame is received, and a reference number representing the part of the source MAC address in the data frame;

fetch from the part of the source MAC address of the received modified data frame, the switch ID;

determine if there is a switch table in the transit switch device;

if it is determined that there is no switch table in the transit switch device,
generate a switch table, and include in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received,
include in the switch table the fetched switch ID and the port number indicating the port of the transit switch device from which the modified data frame is received; and forward or flood, towards a destination host node, the modified data frame to at least one switch device of the plurality of switch devices.

According to a sixth aspect of embodiments herein, there is also provided a destination switch device for switching data frames in a communications network comprising a plurality of switch devices including the destination switch device, wherein the destination switch device comprises a processor and a memory, said memory containing instructions executable by said processor whereby said destination switch device is operative to:

receive a modified data frame from a transit switch device, wherein the modified data frame is modified from a data frame including a source Media Access Control, MAC, address of a source host node, and a destination MAC address, by modifying a part of the source MAC address in the data frame with information comprising: a switch ID, a port number indicating a port of a source switch device from which the data frame is received, and a reference number representing the part of the source MAC address in the data frame;

fetch from the part of the source MAC address of the received modified data frame, the switch ID;

determine if there is a switch table in the destination switch device;

if it is determined that there is no switch table in the destination switch device,
generate a switch table, and include in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received,
include in the switch table the fetched switch ID and the port number indicating the port of the destination switch device from which the modified data frame is received; and forward or flood the received modified data frame to at least a destination host node device that is connected to the destination switch device.

An advantage of the present disclosure is that there is no need for a MAC address table. Also, there is no unknown unicast frame due to the space limitation of a MAC address table where old entries are removed from the MAC address table, which lead to less broadcasting.

Another advantage of the present disclosure is that the resources usage at the switch devices are reduced. In addition, bandwidth utilization and latency of the network are also reduced.

Other objectives, features and advantages of the embodiments herein will be understood from following detailed description in conjunction with the drawings.

BRIEF DESCRIPTION OF THE DRAWINGS

Examples of embodiments herein are described in more detail with reference to drawings in which.

DETAILED DESCRIPTION

In the following, a detailed description of the exemplary embodiments is presented in conjunction with the drawings to enable easier understanding of the solutions(s) described herein.

Hereinafter are described, according to embodiments herein, methods and switching devices for switching frames. The method(s) may be referred to as a MAC-P (MAC Address Proxy) method. A switch device performing a MAC-P method may be referred to as a MAC-P switch device.

Figure 1:
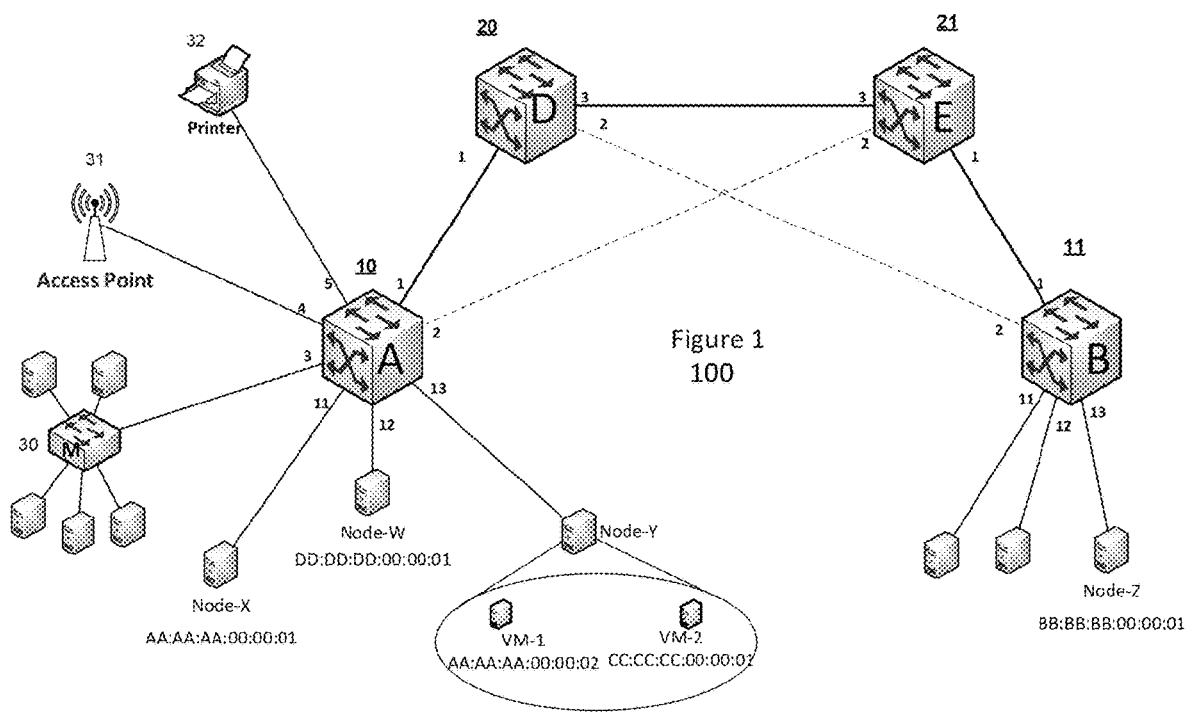
FIG. 1 schematically illustrates an example of a network topology at a Layer 2 domain, in accordance with some embodiments of the present disclosure.

FIG. 1 schematically illustrates an example of a communications network 100 at a Layer 2 domain. A Layer 2 domain is a boundary of connected switch devices with no router-to-router traffic between them. At a Layer 2 domain, nodes communicate with each other only through switch devices, so no traffic between them passes through a router. The communications network 100 may be a wired or wireless communication network such as an LTE, 4G, LTE-A (or LTE-Advanced), 5G, WiMAX, WiFi, WCDMA, GSM network, any 3GPP cellular network, or any cellular network or system.

It is shown in FIG. 1 several connected switch devices A, B, C and D. A switch device may be connected to any type of network device, such as a physical server, a virtual server that hosts one or more Virtual machines (VM), any devices with a standard MAC address (e.g., a printer), and the like. In FIG. 1, switch device A is directly connected to Node-X with MAC address: AA:AA.AA: 00:00:01, Node-W with MAC address: DD:DD:DD: 00:00:01, both of which are bare-metal/physical servers. Switch device A is also directly connected to Node-Y that is a virtual server which hosts two virtual machines (VM), that is, VM-1 with MAC address: AA:AA:AA: 00:00:02 and VM-2 with MAC address: CC:CC:CC: 00:00:01. A virtual server may host one or more virtual machines (VM) that run various operating systems and act as full computing platforms on their own through emulation and virtualization. Switch device A is further directly connected to a standard (i.e., non-MAC-P) switch device M which uses the standard method of MAC address table. Switch device A is further connected to an access point 31 and a printer 32. Switch device B is directly connected among others to a bare-metal/physical server Node-Z with MAC address: BB:BB:BB: 00:00:01.

To have a better understanding of this present disclosure, some terms are explained below together with FIG. 1. A source host node (Node-X) is a node that initiates a communication with another node. A destination host node i(Node-Z) is a node that the source host node intends to communicate with. A source switch device is a switch device that receives a data frame from a source host node. A destination switch device is a switch device that sends a data frame to a destination host node. A transit switch device is a switch device that is not directly connected to a source or destination host node. Instead, a transit switch device is between a source and a destination switch device.

Assume there is a data frame that is sent from Node-X to Node-Z, which passes through switch devices A, D, E and B, Node-X is the source host node and Node-Z is the destination host node. Switch device A is a source switch device since it received the data frame from the source host node Node-X. Switch device B is a destination host node since it sends the data frame further to the destination host node Node-Z. Switch devices D and E are transit switch devices since they are not directly connected to either a source or a destination host node.

Every MAC-P switch device is further assigned a switch ID. For switch devices A, B, D and E, they are assigned to switch ID 10, 11, 20 and 21 (as underlined in FIG. 1). Switch devices A and B with switch ID 10 and 11 are switch devices that are directly connected to a source or a destination host node. They may therefore be referred to as access switches or source/destination switch device. It is to be noticed that FIG. 1 is only for illustration purpose. In some networks, the source and the destination host node may be connected to the same switch device. In that case, the source and destination switch device are the same switch device.

Switch devices D and E with switch ID 20 and 21 are core/aggregation switches that are not directly connected to a node. These switch devices are placed between access switches (i.e., source or destination switch device) to facilitate transferring data frames between a source and a destination host node. In some networks, there may be a three-layer structure for switching, that is, core layer, aggregation layer and access layer. In this present disclosure, core and aggregation layers are treated as one layer. Core and aggregation switches may both be referred to as a transit switch device. There may also be networks where a node is directly connected to a core/aggregation switch where the disclosed MAC-P method still applies.

In FIG. 1, each switch device has a number of ports. These ports are defined into two categories according to our MAC-P method: switch port and access port. Switch port is a port of a MAC-P switch device where the port is directly connected to another MAC-P switch device. As an example, for switch device A with switch ID 10, port 1 and port 2 are switch ports. For switch device D with switch ID 20, ports 1, 2, and 3 are switch ports. Access Port is a port of a MAC-P switch device that is not directly connected to another MAC-P switch device but connected to a device capable of sending a standard data frame to the MAC-P switch device. The standard data frame comprises a standard source MAC address and a standard destination MAC address. As an example, for switch device A with switch ID 10, ports 3, 4, 5, 11, 12, and 13 are access ports. It is to be noted that port 13 of switch device A is directly connected to a virtual server which is also considered as a node. Therefore, port 13 of switch device A is considered as an access port. Ports 3, 4, and 5 of switch device A are connected to devices (i.e., a non-MAC-P standard switch device 30, an access point 31 and a printer 32) from which switch device A may receive standard data frames. Therefore, all those ports 3, 4 and 5 are considered as access ports. For switch device B with switch ID 11, ports 11, 12, and 13 are access ports. Technically, any port other than a switch port may be considered as an access port.

It can be seen from FIG. 1 the following information:

Switch-A (SW-A): 10
Switch-B (SW-B): 11
Switch-D (SW-D): 20
Switch-E (SW-E): 21

Each port of a switch device may be specified if it is an access port or a switch port.

SW-A:
  Switch Ports: 1, 2
  Access Ports: 3, 4, 5, 11, 12, 13
    Port number 2 is not operational. It's disabled by spanning-tree protocol (STP).
SW-B:
  Switch ports: 1, 2
  Access ports: 11, 12, 13
    Port number 2 is not operational. It's disabled by STP.
SW-D:
  Switch ports: 1, 2, 3
  Access ports:—
    Port number 2 is not operational. It's disabled by STP.
SW-E:
  Switch ports: 1, 2, 3
  Access ports:—
    Port number 2 is not operational. It's disabled by STP.

A protocol, such as the spanning-tree protocol (STP), may be used in a network to avoid network loops, broadcast/Unknown-unicast storm, frame duplication, and MAC addresses table corruption. When a protocol such as STP is used, some links between switch devices need to be in non-operational mode. These links are shown as dotted lines in FIG. 1. It can be seen from FIG. 1 that a data link between port 2 of switch device A and port 2 of switch device E is in non-operational mode. Another data link between port 2 of switch device D and port 2 of switch device B is also in non-operational mode.

A structure of a data frame may be seen below:

| Layer 2 address | | Layer 3 address | | Payload |
| --- | --- | --- | --- | --- |
| Destination MAC address | Source MAC address | Source IP address | Destination IP address | |

It is to be noticed that the main focus of this present disclosure is Layer 2 MAC address parts of the data frame.

A standard MAC address is a unique 48-bit data divided into two 24-bit parts. It may be shown as a 12-digit hexadecimal number (i.e., 6-Byte binary number), usually represented by Colon-Hexadecimal notation.

The leftmost 24-bit part (6-digits, e.g., 00:40:96) may be a unique ID, known as Organizationally Unique Identifier (OUI), that is assigned by IEEE to each manufacturer of Network Interface Controller (NIC). IEEE Registration Authority Committee assigns these MAC prefixes to its registered vendors.

Some examples of OUI for well-known manufacturers are the following:

CC:46:D6-Cisco
3C:5A:B4-Google, Inc.
3C:D9:2B-Hewlett Packard
00:9A:CD-HUAWEI TECHNOLOGIES CO., LTD The second 24-bit may be assigned by each vendor internally and known as Network Interface Controller (NIC). This NIC part is vendor specific for internal usage.

The combination of these two 24-bit parts creates an MAC address that is unique worldwide, which can be seen below.

| MAC Address 48-bit | |
|---|---|
| OUI | NIC |
| 24-bit (3 Octets) | 24-bit (3 Octets) |

To illustrate how the proposed MAC-P method works, in some embodiments, there are two main situations that are considered based the type of the data frame.

Situation-A: A switch device receives a broadcast frame.
Situation-B: A switch device receives a unicast frame.

It is assumed that the nodes in the network do not have any information about each other and the nodes communicate with each other at a Layer 2 domain. The switch devices in the network are MAC-P switch devices without standard MAC address table. Each MAC-P switch device may have a unique switch ID that is assigned either automatically by a protocol that runs between switch devices, or manually by a network administrator. Each switch port may be specified if it is an access port or a switch port depending on if the port is connected to a MAC-P switch device or not.

Considering Situation-A when a switch device receives a data frame such as for example a broadcast frame.

A-1:

A source host node (Node-X) generates a broadcast frame and sends it out through its port connected to a MAC-P switch device. This broadcast frame can be either an Address Resolution Protocol (ARP) request to find out a MAC address of a destination host node (Node-Z) or a broadcast data frame.

A-2:

The switch device receives this broadcast frame. Since the broadcast frame comes from an access port, the switch device considers itself a source switch device.

Since the destination MAC address field of this arrived broadcast frame is a broadcast entry, the source switch device will flood this broadcast frame. Before flooding, the following actions may be performed by the source switch device.

a) The source switch device generates a table named as an OUI table if this table has not been already created.

b) The source switch assigns a locally unique index (i.e., a reference number) to that OUI part of the source MAC address field of the arrived broadcast frame. If there isn't an index mapped to that OUI part of the source MAC address in the OUI table, the switch device generates a new entry in the OUI table where the locally unique index is associated with that OUI part of the source MAC address of the arrived broadcast frame. Hence, the source switch device generates a table (e.g., a OUI table) and includes in an entry of the generated table, the reference number, and the part of the source MAC address In the OUI table, each OUI entry is only associated with a locally unique index and vice versa. If the source switch device receives another data frame and the OUI part of the source MAC address field of the data frame is already associated with an index in the OUI Table, no new index will be assigned to that OUI part of the source MAC address field of the data frame.

The OUI entry and the locally unique index is associated with each other one to one. That is, there will be no index that is associated with more than one OUI entry, and there will be no OUI entry that is associated with two different indexes at a specific switch device.

c) The source switch device 10 clears the OUI part of the broadcast frame and divides the OUI part into three sections to fill in with three new entries. In other words, the original OUI part of the broadcast frame is replaced with information comprising three sections. Each section may consist of one byte. i) The leftmost section represents the switch ID of the source switch device. ii). The middle section represents a port number indicating a port of the source switch device from which port the broadcast frame is received. iii). The rightmost section represents an OUI index (i.e., a reference number representing or indicating the part of the source MAC address or in other words, the original OUI of the original source MAC address of the source host node). This OUI index is associated with the original OUI part of the source MAC address of the arrived data frame, i.e., a broadcast frame in the OUI table.

Optionally, only the source switch device may modify the OUI part of the source MAC address field of the arrived data frame.

d) The source switch device forwards or floods the modified broadcast frame towards the destination host node (Node-Z), the modified data frame to at least one switch device of the plurality of switch devices.

As previously described, the part of the source MAC address is an OUI; and the method comprises obtaining a switch ID for each of the plurality of switch devices. The source switch device 10 being provided with a switch identity (switch ID).

A-3:

The next switch device receives the broadcast frame. Since the broadcast frame comes from a switch port, this next switch device is either a transit switch device or a destination switch device. For a broadcast frame, the next switch may take the same action in either situation.

a) The next switch device, being a transit switch device, looks at the OUI part of the source MAC address field of the broadcast frame and identifies the switch ID part. the transit switch device fetches from the part of the source MAC address field of the received modified data frame, modified as described earlier, the switch ID.

Then the next switch device (i.e., the transit switch device) generates a table named as switch table if it does not already exist. The next switch device imports that switch ID and a port number indicating a port of the next switch device from which port the broadcast frame is received into the switch table, if there is no entry already available for that switch ID. This switch port may be named as a gateway port. Thus, the transit switch device generates a switch table, and includes in the generated switch table the fetched switch ID and a port number indicating a port of the transit switch device (21) from which the modified data frame is received b) As the next action, the transit switch device forwards or floods the broadcast frame towards a destination host node (Node-Z), the modified data frame to at least one switch device of the plurality of switch devices.

It is to be noticed that a transit switch device may not modify the data frame fields at all.

This process continues until a destination switch device 11, or B in FIG. 1 and the broadcast frame reaches a destination host node (Node-Z).

A-4:

Among all nodes that receive this broadcast frame, a destination host node that sees its own IP address as the destination IP address in the Layer 3 part of the broadcast frame accepts the broadcast frame.

The first situation for a data frame being e.g., a broadcast frame is thus completed.

Now let's look at the second situation, Situation-B, when a switch device receives a unicast frame.

B-1:

Source host node (Node-X) generates a unicast frame and sends it out through its port connected to a switch device 10. This unicast frame can be either an ARP reply frame in response to an ARP request or a unicast data frame.

B-2:

The switch device 10 receives this unicast frame. However, from the switch device perspective, it is only a unicast frame. Therefore, the switch may not distinguish if this unicast frame is an ARP reply or any other type of unicast frame.

Since the unicast frame comes from an access port, the switch device 10 considers itself as a source switch device 10.

Before sending out the unicast frame, the procedure for the source switch device receiving a unicast is the same as for the source switch device receiving a broadcast frame.

a) The source switch device 10 assigns a locally unique index (i.e., a reference number) to that OUI part of the source MAC address field of the arrived unicast frame. The source switch device then associates the locally unique index with the OUI part of the source MAC address field of the arrived unicast frame in an OUI table if there is not already any index associated with that OUI entry.

It is to be noticed that when the source switch device receives a unicast frame, it may not need to create an OUI table because this unicast frame is a response to a broadcast frame or another unicast frame. In either case, there may be an OUI table that is available at the source switch device.

b) The source switch device 10 clears the OUI part of the source MAC address field of the arrived unicast frame and divides it into three sections to fill in three new entries. In other words, the original/standard OUI part of the original source MAC address is replaced with information comprising three sections (i.e., three parts). Each section may consist of one byte. i). The leftmost part represents a switch ID of the source switch device. ii) The middle part represents a port number indicating a port of the source switch device from which port the unicast frame is received. iii) The rightmost part represents an OUI index (i.e., reference number), which is associated with the original/standard OUI part of the source MAC address field of the arrived unicast frame in the OUI table.

c) Then the source switch device 10 will forward or flood the modified unicast frame towards the destination host node (Node-Z), to at least one switch device of the plurality of switch devices. Since this is a unicast frame, the source switch device 10 needs to know where the unicast frame should send out, in other words, which switch port of the source switch device needs to be chosen to send out the unicast frame.

In order to do so, the source switch device 10 looks at the destination MAC address field of the unicast frame, especially at the switch ID section. Then the source switch device looks up this switch ID in its switch table. There should be an entry where a port number is associated with this switch ID. The source switch device 10 should have learned the right port number for this switch ID when it received a broadcast frame.

Based on this information, the source switch device sends out the unicast frame through a gateway port having the port number being associated with this switch ID in the switch table.

If there is any unexpected situation that the source switch device couldn't find any entry for that switch ID identified from the destination MAC address filed of the unicast frame in its switch table, the source switch device broadcasts the unicast frame.

B-3:

The next switch device receives the unicast frame. Since the unicast frame is received from a switch port, this next switch device is either a transit switch device or a destination switch device. In either situation, the next switch device takes some common actions before making the forwarding decision.

The next switch device looks at the OUI part inside the source MAC address field of the unicast frame and fetches/identifies the switch ID part.

Then the next switch device imports that switch ID, and a port number of a switch port from which the unicast frame is received into a switch table if there is no entry already existing for that switch ID. This switch port may be referred to as a gateway port.

The next switch device takes a different action based on whether it is a transit switch device, or a destination switch device.

To determine if the next switch device is a transit switch device or a destination switch device, the next switch device looks at the switch ID entry inside the OUI part of the destination MAC address field of the unicast frame. If the switch ID entry inside the OUI part of the destination MAC address field of the unicast frame is not the same as the switch ID of the next switch device, then this next switch device is a transit switch device. Otherwise, if the switch ID entry inside the OUI part of the destination MAC address field of the unicast frame is the same as the switch ID of the next switch device, the next switch device is a destination switch device.

B3-a: If the next switch device is a transit switch device:

In this case, the next switch device looks up the switch ID entry of the OUI part of the destination MAC address field of the unicast frame in its switch table. The next switch device then sends out the unicast frame through a gateway port associated with that switch ID in its switch table. No further action by the next (transit) switch device may be needed.

If the next switch device couldn't find any entry for that switch ID of the OUI part of the destination MAC address field of the unicast frame in its switch table, the next switch device may broadcast the unicast frame.

It is to be noticed that a transit switch device may not modify the data frame fields at all.

B3-b: If the next switch device is a destination switch device e.g., B in FIG. 1.

The destination switch device needs to modify the OUI part of the destination MAC address field of the unicast frame before forwarding the frame to the destination host node, since this OUI part of the destination MAC address field of the unicast frame is not the original standard OUI. Here is what the destination switch device does:
- a) Fetches/identifies port number entry from the OUI part of the destination MAC address field of the unicast frame. This port number is placed in the second section (middle byte) of the OUI part of the destination MAC address field. The destination switch device uses this port number to forward the unicast frame toward the destination host node.
- b) Fetches/identifies OUI index from the OUI part of the destination MAC address field of the unicast frame. This OUI index is placed in the third section (rightmost byte) of the OUI part of the destination MAC address field.

Then the destination switch device looks up this OUI index in its OUI table to see what OUI entry is associated with this OUI index. The destination switch device uses this OUI entry to replace the modified OUI part of the destination MAC address field of the arrived unicast frame with the original OUI of the MAC address of the destination host node.
- c) The destination switch device replaces the whole OUI part of the destination MAC address field of the arrived unicast frame with the original standard OUI entry that has already been looked up from its OUI Table.

By doing the above action, the destination switch device sets the destination MAC address field of the unicast frame the same as the original MAC address of the destination host Node. In this case, when the destination switch device sends out the unicast frame to the destination host node, the destination host node accepts the unicast frame because it sees its own MAC address as the destination MAC address field inside the unicast frame.
- d) And the destination switch device sends out the unicast frame through the port number that was already fetched from the OUI part of the destination MAC address field of the unicast frame.

It is to be noticed that only the destination switch device modifies the OUI part of the destination MAC address field of the unicast frame. If the data frame is a broadcast frame, even the destination switch device does not modify the destination MAC address field of the data frame.

B-4:

The destination host node receives the unicast frame. Since it sees its own MAC address in the destination MAC address field of the unicast frame, it accepts the unicast frame.

It is to be noticed that only the source and destination switch device modify the MAC address field of a data frame. Transit switches do not modify the data frame at all. Also, NIC part of the data frame may never get modified. Only the OUI part may be modified.

The source switch device may modify the OUI part of the arrived data frame's source MAC address field. The destination switch device may modify the OUI part of the arrived data frame's destination MAC address field only if the data frame is a unicast frame.

It is to be noticed that the size and order for the three sections in the modified OUI part of the source MAC address field of the data frame is not fixed. Instead, it is adjustable based on different situations or network demands.

Figure 2:
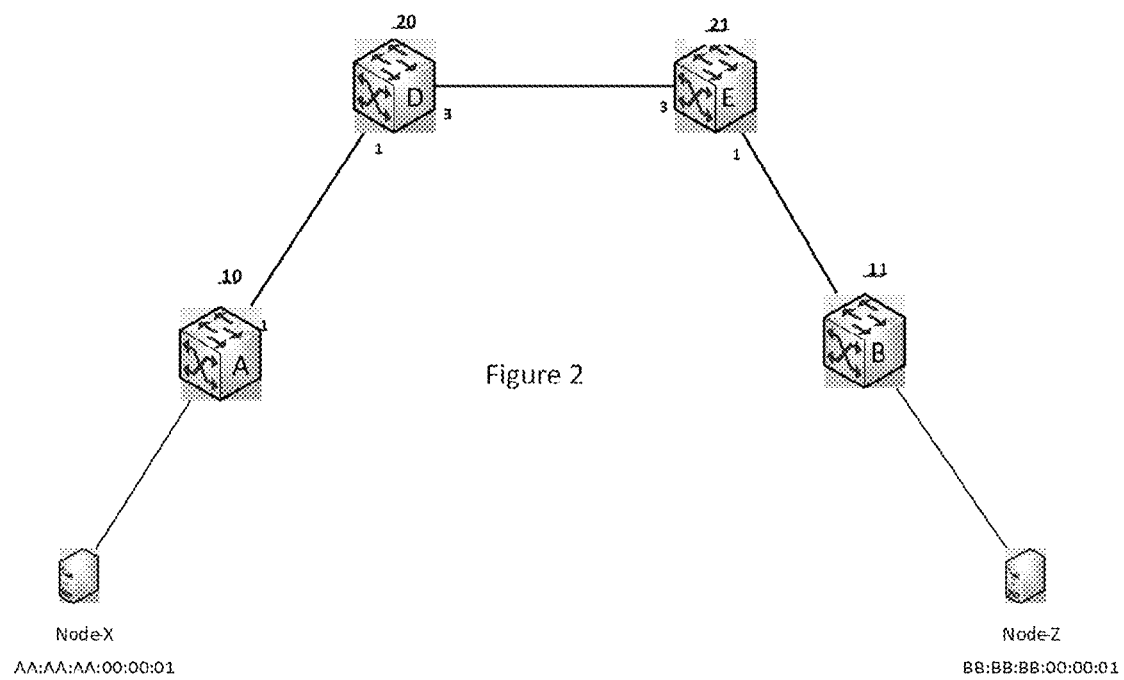
FIG. 2 schematically illustrates an example of node communications between two nodes, in accordance with some embodiments of the present disclosure.
Figure 3:
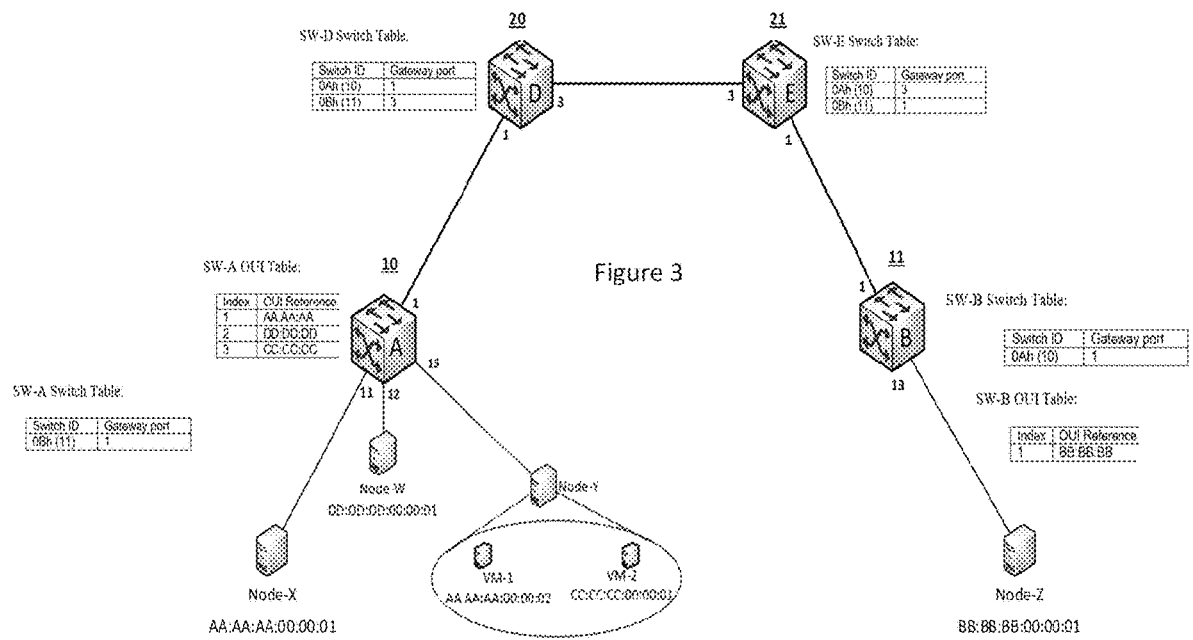
FIG. 3 schematically illustrates an example of tables generated at switch devices, in accordance with some embodiments of the present disclosure.

With reference to FIG. 2 and FIG. 3, a detailed example will be used to illustrate how the proposed present disclosure works. FIG. 2 schematically illustrates an example of node communications between two nodes, in accordance with some embodiments of the present disclosure. In FIG. 2, there are a plurality of (MAC-P) switch devices: Switch-A (SW-A): 10, Switch-B (SW-B): 11, Switch-D (SW-D): 20, and Switch-E (SW-E): 21.

At the beginning, the nodes of the network don't have information about each other. Assume that Node-X wants to initiate a communication with Node-Z, in this case, Node-X is considered a source host node and Node-Z as a destination host node. Node-X generates and sends out a broadcast ARP request to find out the MAC address of Node-Z.

As it is a broadcast frame, we follow Situation-A:

A-1:

ARP Request is sent out by Node-X as following:

| Layer 2 address | | |
|---|---|---|
| Destination MAC address | Source MAC address | ARP request fields |
| FF:FF:FF:FF:FF:FF | AA:AA:AA:00:00:01 | — — — — |

It is to be noticed that for this present disclosure, the main focus is the Layer 2 MAC address modification of a data frame, including the destination and source MAC address. The ARP request field may not be further discussed.

A-2:

SW-A receives this ARP request broadcast frame. However, from the switch perspective, it is only a broadcast frame. Therefore, the switch device does not distinguish if this broadcast frame is an ARP request or any other type of broadcast frame.

Because the ARP request broadcast frame comes from an access port, SW-A considers itself a source switch device. Since the destination MAC address field of this arrived data frame is a broadcast entry, SW-A knows that this frame should be flooded. But before the flooding, it may take the following actions:
- a) SW-A creates a new table named OUI Table as following:

| Index | OUI Reference |
|---|---|

- b) SW-A assigns a locally unique index (i.e., a reference number) to that OUI part of the source MAC address field of the arrived data frame. Then, a new entry is generated in the OUI table where the locally unique index is associated with that OUI part of the source MAC address field of the arrived data frame, if there is no entry available where the locally unique index is associated with/mapped to that OUI entry.

SW-A OUI Table:

| Index | OUI Reference |
|---|---|
| 1 | AA:AA:AA |

SW-A clears the original OUI part and then divides the OUI part of the source MAC address field of the arrived data frame into three sections. There is no changes to the NIC part. It can be seen as following:

| Source MAC Address field 48-bit | | | |
|---|---|---|---|
| OUI 24-bit (3 Octets) | | | |
| Switch ID | Port Number | OUI Index | NIC 24-bit (3 Octets) |
| — | — | — | 00:00:01 |

The three sections comprise: i) The leftmost byte (first byte) represents the switch ID. In this example, it is 10. ii) The middle byte (second byte) represents the port number of the switch device from which port the data frame is received. In this example, it is Port-11. iii) The rightmost byte (third byte) represents the OUI index from the OUI table. In this example, it is 1. It can be seen from the table below that the OUI field entries in the following source MAC address field are shown in Hex format. Switch ID for SW-A in decimal format is "10". It is equal to "0A" in Hex format (0Ah). Port number of SW-A from which port the data frame is received in decimal format is "11". It is equal to "0B" in Hex format (0Bh). OUI Index that is assigned to the OUI part of the source MAC address field of the arrived data frame in decimal format is "1". It is equal to "01" in Hex format (01h).

The modified source MAC address is the following:

| Source MAC Address field 48-bit | | | |
|---|---|---|---|
| OUI 24-bit (3 Octets) | | | |
| Switch ID | Port Number | OUI Index | NIC 24-bit (3 Octets) |
| 0Ah (10) | 0Bh (11) | 01h (1) | 00:00:01 |

The modified data frame by SW-A as a whole is the following:

| Layer 2 address | | |
|---|---|---|
| Destination MAC address | Source MAC address | ARP request fields |
| FF:FF:FF:FF:FF:FF | 0A:0B:01:00:00:01 | — — — — | c) Then SW-A floods the ARP broadcast frame.

As it is shown above, there is no MAC address learning on the source switch device which is advantageous.

A-3:

The next switch device SW-D receives the ARP request frame. SW-D is either a transit or destination switch device since the ARP request frame comes from a switch port. Because this is a broadcast frame, the next switch device SW-D takes the same action in either situation.

SW-D looks at the OUI part of the source MAC address field of the ARP request frame and fetches/identifies the switch ID part. In this example, it is 0Ah (10). Then SW-D creates a table named switch table and imports that switch ID and the switch port from which the ARP request frame is received at SW-D into the switch table.

SW-D Switch Table:

| Switch ID | Gateway port |
|---|---|
| 0Ah (10) | 1 |

Because this is a broadcast frame, SW-D floods this ARP request frame. As it is shown, there is no MAC address learning on SW-D either.

The next switch device SW-E receives this ARP request frame. SW-E does the same as SW-D did. It means no change on the ARP request frame. A switch table is generated and updated. Since it is a broadcast frame, SW-E floods the ARP request frame:

SW-E switch table can be seen as below, and there is no MAC address learning on this switch device SW-E either.

| Switch ID | Gateway port |
|---|---|
| 0Ah (10) | 3 |

The next switch device SW-B receives this ARP request frame. SW-B does the same as SW-E did. It means no change on the ARP request frame. A switch table is generated and updated. Since it is a broadcast frame, SW-B floods the ARP request frame.

There is no MAC address learning on this switch device SW-B either.

SW-B Switch Table:

| Switch ID | Gateway port |
|---|---|
| 0Ah (10) | 1 |

A-4:

All nodes directly connected to SW-B, including Node-Z, receive this ARP request frame. Node-Z accepts this ARP request frame because it sees its own IP address in the ARP request frame.

The procedure for a first situation of a broadcast frame is thus completed.

B-1:

Now Node-Z is configured to respond to that ARP request frame/message. To do that, it generates a unicast ARP reply frame to send out to Node-X. It is to be noticed that the source MAC address field of this ARP reply frame is MAC address of Node-Z. The destination MAC address field of this ARP reply frame is the source MAC address of the arrived ARP request (i.e., the modified MAC address of Node-X).

Layer 2 part of this unicast ARP reply frame generated by Node-Z, which includes the destination and source MAC address, can be seen as following:

| Layer 2 address | | |
|---|---|---|
| Destination MAC address | Source MAC address | ARP reply fields |
| 0A:0B:01:00:00:01 | BB:BB:BB:00:00:01 | — — — — |

B-2:

SW-B receives this unicast ARP Reply frame. From the switch perspective, it is only a unicast frame. Because the frame came from an access port, it considers itself a source switch. The procedure that SW-B follows before making the forwarding decision is the same procedure as a source switch device receives a broadcast frame.

SW-B assigns a locally significant unique index to that OUI part of the source MAC address field of the arrived frame. Then, it maps them together into the OUI Table if there is not already any index mapped to that OUI entry.

SW-B OUI Table:

| Index | OUI Reference |
|---|---|
| 1 | BB:BB:BB | a) SW-B clears the OUI part of the source MAC address field of the arrived ARP reply frame and divides it into three sections to fill in three new entries: i) The leftmost part represents the source switch's switch ID. In this example, it is 0Bh (11). ii) The middle part represents the source switch's port number at which port the ARP reply frame arrives from a source host node. In this example, it is 0Dh (13). iii) The rightmost part represents the OUI index, which is mapped to/associated with the OUI part of the source MAC address field of the arrived ARP reply frame in the OUI table. In this example, the OUI index is 01h (01).

No changes will be made to the NIC part of the MAC address field, and the modified source MAC address field of the arrived ARP reply frame by SW-B can be seen below:

| Source MAC Address field 48-bit | | | |
|---|---|---|---|
| OUI 24-bit (3 Octets) | | | NIC |
| Switch ID | Port Number | OUI Index | 24-bit (3 Octets) |
| 0Bh (11) | 0Dh (13) | 01h (1) | 00:00:01 |

The modified data frame is as following:

| Layer 2 address | | |
|---|---|---|
| Destination MAC address | Source MAC address | ARP reply fields |
| 0A:0B:01:00:00:01 | 0B:0D:01:00:00:01 | — — — — | b) Then SW-B needs to forward the ARP reply frame. As this is a unicast frame the switch device SW-B follows the following procedure:
  i. SW-B needs to know where the data frame should be sent out, in other words, which switch port needs to be chosen to send out the ARP reply frame through that port. Therefore, SW-B looks at the destination MAC address field of the ARP reply frame, specifically at the switch ID section. In this example, it is 0Ah (10):

| Destination MAC address |
|---|
| 0A:0B:01:00:00:01 | ii. Then SW-B looks up this switch ID in its switch table. There should be an entry as a gateway port mapped to this switch ID in the switch table. SW-B may have learned this when it received a broadcast frame.

SW-B switch table:

| Switch ID | Gateway port |
|---|---|
| 0Ah (10) | 1 |

Based on the switch table, the source switch device sends out the ARP reply frame through the gateway port, port 1, which is mapped to the switch ID 0Ah (10) inside the switch table.

B-3:

The next switch device, SW-E receives the ARP reply frame. Since the ARP reply frame comes from a switch port, SW-E is either a transit switch device or a destination switch device. In either situation, SW-E takes some common actions before making the forwarding decision:

a) SW-E looks at the OUI part inside the source MAC address field of the data frame and fetches the switch ID part. In this example, it is 0Bh (11).

| Source MAC address |
|---|
| 0B:0D:01:00:00:01 | b) Then SW-E imports that switch ID, and the switch port, port 1, at which port the ARP reply frame arrived, into this switch table if there is no entry already existing for that switch ID.

SW-E Switch Table:

| Switch ID | Gateway port |
|---|---|
| 0Ah (10) | 3 |
| 0Bh (11) | 1 |

SW-E takes different actions based on if itself is a transit switch device or a destination switch device. SW-E looks at the switch ID entry inside the OUI part of the destination MAC address field of the frame. In this example, it is 0Ah (10).

| Destination MAC address |
|---|
| 0A:0B:01:00:00:01 |

Because this switch ID, 0Ah (10), is not the same as the switch ID of SW-E, 15h (21), SW-E is a transit switch device.

B3-a:

SW-E looks up the switch ID entry of the OUI part of the destination MAC address field of the frame, 0Ah (10), into its switch table:

SW-E Switch Table:

| Switch ID | Gateway port |
|---|---|
| 0Ah (10) | 3 |
| 0Bh (11) | 1 |

SW-E sends out the ARP reply frame through the gateway port (port 3) mapped to that switch ID. No further action by SW-E may be needed.

B-3:
   The next switch device, SW-D receives the data frame. SW-D is either a transit or destination switch device because the ARP reply frame comes from a switch port. In either situation, SW-D takes some common actions before making the forwarding decision:
   a) SW-D looks at the OUI part inside the source MAC address field of the data frame and fetches the switch ID part. In this example, it is 0Bh (11).

| Source MAC address |
|---|
| 0B:0D:01:00:00:01 | b) Then SW-D imports that SW-ID, and the switch port, port 3, at which port the ARP reply frame arrived, into the switch table if there is no entry already existing for that switch ID.
SW-D Switch Table:

| Switch ID | Gateway port |
|---|---|
| 0Ah (10) | 1 |
| 0Bh (11) | 3 |

SW-D performs a different action based on if SW-D is a transit switch device or a destination switch device:
   SW-D looks at the switch ID entry inside the OUI part of the destination MAC address field of the ARP reply frame. In this example, it is 0Ah (10).

| Destination MAC address |
|---|
| 0A:0B:01:00:00:01 |

Because this switch ID, 0Ah, is not the same as the ID of the SW-D, 14h (20), SW-D is a transit switch device.
B3-a:
   In this case, SW-D looks up the switch ID entry of the OUI part of the destination MAC address field of the frame, 0Ah (10), into its Switch Table:
   SW-D Switch Table:

| | Gateway port |
|---|---|
| 0Ah (10) | 1 |
| 0Bh (11) | 3 |

SW-D sends out the ARP reply frame through the gateway port (port 1) mapped to that switch ID. No further action by SW-D is needed.

B3:
   The next switch device, SW-A receives the ARP reply frame. SW-A is either a transit or destination switch device because the ARP reply frame comes from a switch port. In either situation, SW-A performs some c actions before making the forwarding decision:
   a) SW-A looks at the OUI part inside the source MAC address field of the frame and fetches the switch ID part. In this example, it is 0Bh (11).

| Source MAC address |
|---|
| 0B:0D:01:00:00:01 | b) Then SW-A imports that switch ID, and the switch port, Port 1, at which port the ARP reply frame arrived, into this table if there is no entry already existing for that switch ID.
SW-A Switch Table:

| Switch ID | Gateway port |
|---|---|
| 0Bh (11) | 1 |

SW-A takes a different action based on whether SW-A is a transit switch or a destination switch. SW-A looks at the switch ID entry inside the OUI part of the destination MAC address field of the frame. In this example, it is 0Ah (10).

| Destination MAC address |
|---|
| 0A:0B:01:00:00:01 |

Because this switch ID, 0Ah, is the same as the switch ID for SW-A, 0Ah (10), SW-A is a destination switch device.
B3-b:
   Since SW-A, is a destination switch device, SW-A needs to modify the OUI part of the destination MAC address field of the frame before forwarding the frame to the destination node.

| Destination MAC address |
|---|
| 0A:0B:01:00:00:01 |

The destination switch device takes the following actions:
   a) Fetches port number entry from the OUI part of the destination MAC address field of the ARP reply frame. This data is placed in the second section (middle byte) of the OUI part of the destination MAC address field. In this example, it is port 11 (0Bh). SW-A uses this port to forward the ARP reply frame toward the destination host node.
   b) Fetches OUI index from the OUI part of the destination MAC address field of the ARP reply frame. This data is placed in the third section (rightmost byte) of the OUI part of the destination MAC address field. In this example, it is 1.
   Then SW-A looks up this index in its OUI Table to see what OUI entry is mapped with this index. SW-A uses this entry to replace the modified OUI part of the destination MAC address field of the arrived ARP reply frame with the original OUI of the MAC address of the destination node. In this example, it is AA:AA:AA.

SW-A OUI Table:

| Index | OUI Reference |
|-------|---------------|
| 1     | AA:AA:AA      | c) Now the SW-A replaces the whole OUI part of the destination MAC address field of the arrived ARP reply frame with the OUI entry that has already been looked up from its OUI Table. The new modified destination MAC address filed of the arrived frame looks like this:

d)

| Destination MAC address |
|-------------------------|
| AA:AA:AA:00:00:01       |

The ARP reply frame's modified destination MAC address field is the real (i.e. original standard) MAC address of the destination node, Node-X. In this case, when SW-A sends out the ARP reply frame to Node-X, Node-X accepts the ARP reply frame because it sees its own MAC address as the destination MAC address field inside the ARP reply frame.

e) As the final action, the SW-A switch device sends out the ARP reply frame through the port number that was already fetched from the OUI part of the destination MAC address field of the ARP reply frame.

B4:

Node-X as the destination host node receives the ARP reply frame. As Node-X sees its own MAC address as the destination MAC address field of the ARP reply frame, it accepts this frame.

By doing the above process, we finalized a two-way communication between two nodes, including a broadcast frame and a unicast frame.

For SW-A, there may be data frames that come from other access ports of SW-A. For instance, from port 13, connected to a Virtual Server, or port 3, connected to a non-MAC-P switch which is considered as a source host node to SW-A. The procedure for handling data frames received from these nodes is the same as the procedure SW-A takes for Node-X.

When SW-A receives some other data frames from Node-W and Node-Y, the OUI table of SW-A may look like as the following:

| Index | OUI Reference |
|-------|---------------|
| 1     | AA:AA:AA      |
| 2     | DD:DD:DD      |
| 3     | CC:CC:CC      |

FIG. 3 illustrates an example of tables generated at switch devices, in accordance with some embodiments of the present disclosure. It is shown in FIG. 3 the OUI tables and switch tables that are generated and updated for switch devices A, B, D and E after the node communications mentioned above. In FIG. 3, for source or destination switch device A and D (i.e., access switches) that are directly connected to a node, there are a switch table and an OUI table for each of these two switch devices. For transit switch devices D and E (i.e., core/aggregate switches), there is only a switch table for each of these two switch devices since no modification to the data frame is necessary at a transit switch device. It is shown in FIG. 3 that only one index is mapped to the OUI AA:AA:AA in the OUI table at switch device A, although there are two nodes VM-1 and Node X with the same OUI section in their MAC address.

Some advantages of using switch table and OUI table instead of MAC Address table are the following:

The size of an OUI table is not dependent on how many nodes that are connected to the access switches, because the numbers of entries in the OUI Table are based on the number of different OUIs of MAC addresses of the connected nodes, not the number of connected nodes. In a network with a large number of nodes, the size of an OUT table is much smaller than a MAC address table.

Switches do not need to know the number of nodes present in a network to learn their MAC addresses. The number of entries in a switch table is limited to the number of MAC-P switch devices in the network. In a network with a large number of nodes, the size of a switch table is much smaller than a MAC address table.

Using MAC-P method, OUI tables and switch tables at switch devices get updated quickly when a network topology starts to work. After passing some data frames, OUI Tables gets updated with most of the OUI entries in the network topology. Also, switch tables get updated quickly about most of the switch devices in the network topology.

Using MAC-P method, there is not so much ongoing update for OUI tables and switch tables since they are independent on the number of nodes or changes of nodes, while with MAC address tables switch devices need to keep their MAC address tables up to date actively.

Unknown unicast frames are avoided largely using MAC-P method.

Using the proposed methods according to the present disclosure, none of the switch devices need to have a MAC address table, and there is no need to register the MAC address of nodes. What is needed is only the following:

A switch table whose entries are limited to the number of MAC-P switch devices in the network.

An OUI table that is only needed for access switches, not for core/aggregate switches. The entries of an OUI table are limited to the number of OUI entries on the connected network adapter cards to a particular switch device.

Unlike the standard MAC address learning procedure, no individual entry for each node is necessary. Considering the node communication between Node-X and Node-Z, if a standard MAC address learning process was running on this topology, all switch devices would update their MAC address tables by one entry for Node-X and one for Node-Z. And as soon as a new node starts to initiate a communication, all switches need to add the MAC address of that node into their MAC address table as well. Assume if we have hundreds or thousands of nodes in the network, all switch devices need to register the MAC address of all nodes in their MAC address tables.

As mentioned previously, a switch device has a limitation on the size of a MAC address table. Therefore, a switch device cannot register the MAC address of all nodes. To address this issue, commonly, the switch device overwrites the old MAC address entries with the new ones. This solution might help, but it introduces unknown unicast frames and increases the rate of broadcasting in the network.

In a standard MAC address learning method, each switch device should know the next hop for every MAC address in the destination field of an arrived data frame. It means one entry per MAC address. Using MAC-P, for all nodes connected to a single switch device, there is only one entry: the SW-ID. Hence, a switch device only needs to know the next hop to reach the switch device specified in the destination MAC address field of the frame.

For example, consider a network with 50 switch devices and 10,000 nodes connected to different switch devices in the network topology, each switch device may need a MAC address table with 10,000 entries if a standard MAC address learning procedure is used.

Using the solution of the MAC-P method herein, every switch device, instead of having a MAC address table, has a switch table with at most 50 entries. Additionally, the access switches need to have an OUI table with a few entries since the number of OUIs are very limited. It is because at a Layer two network topology, service providers, or data centers may only use nodes from a few vendors. As a result, it is common that nodes are limited to no more than five to ten vendors, i.e., Cisco, HP, Dell, VMware, Microsoft, and Apple, and each vendor may only have one specific OUI.

Therefore, one byte as the index field in the modified OUI MAC address may be enough. For one byte, up to 256 different Indexes or 256 different OUIs can be addressed. Normally, much fewer vendors than 256 are used in a single network topology. Also, the OUI Table is locally significant on each switch device in the network topology. In other words, we can have up to 256 different vendors connected to a single switch device, not the whole topology. It is almost impossible for a network to have different nodes connected to a single switch device belonging to more than 256 vendors.

Regarding the one-byte assignment for a switch ID in the modified OUI part of the MAC address, since each switch device may have a unique ID in the whole topology, up to 256 switch devices may be addressed by this one-byte field. In general, it is not recommended to have a single layer two domain with more than 256 connected switch devices.

Regarding the one-byte assignment for a port number in the modified OUI part of the MAC address, up to 256 connected ports to a single switch device can be addressed because this field is also locally significant.

It is further to be noticed, regarding the proposed structure for the modified OUI part of the MAC address, having one byte (8 bits) for each field is just one option. Based on various situations in different topologies, the structure for the modified OUI part of the MAC address is adjustable. For instance, we may assign five bites for an OUI index field, nine bites for port number field, and ten bites for switch ID field.

Figure 4:
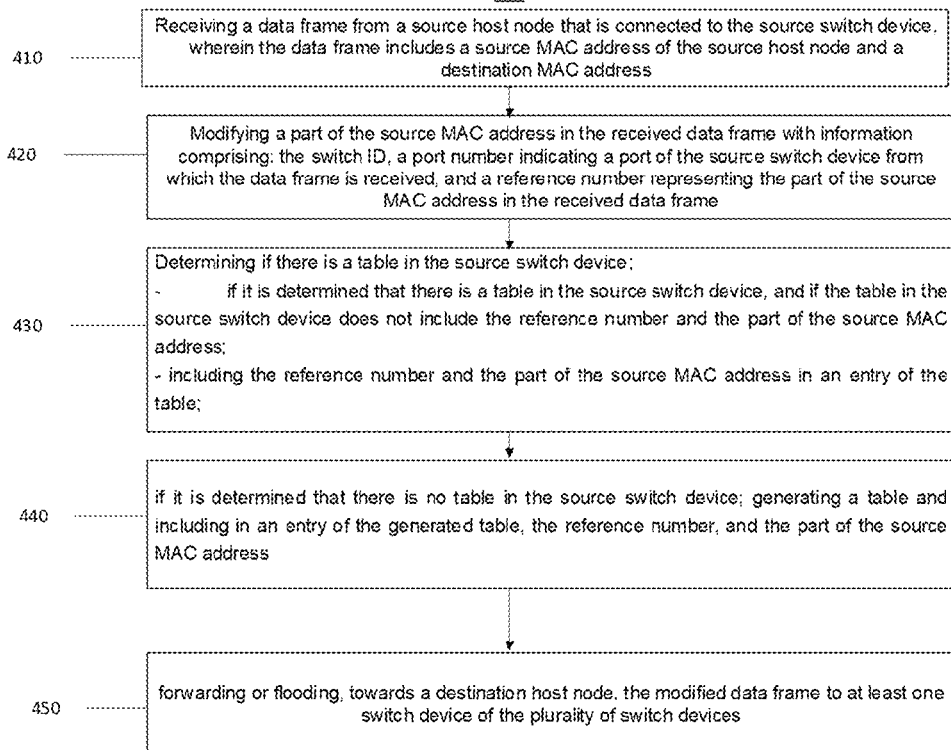
FIG. 4 is a flowchart of a method performed by a source switch device for switching data frames, according to some embodiments of the present disclosure.

FIG. 4 is a flowchart of a method 400 performed by a switch device for switching data frames in a communications network, according to some embodiments of the present disclosure. The communications network comprises a plurality of switch devices. The method is performed by a source switch device e.g., switch 10. The method comprises the following.

410: receiving a data frame from a source host node that is connected to the source switch device, wherein the data frame includes a source MAC address of the source host node; and a destination MAC address;

420: modifying a part of the source MAC address in the received data frame with information comprising: the switch ID, a port number indicating a port of the source switch device from which the data frame is received, and a reference number representing the part of the source MAC address in the received data frame;

430: determining if there is a table in the source switch device;
    if it is determined that there is a table in the source switch device, and if the table in the source switch device does not include the reference number and the part of the source MAC address;
        including the reference number and the part of the source MAC address in an entry of the table;

440: if it is determined that there is no table in the source switch device;
    generating a table and including in an entry of the generated table, the reference number, and the part of the source MAC address; and 450: forwarding or flooding, towards a destination host node, the modified data frame to at least one switch device of the plurality of switch devices.

In some embodiments, the part of the source MAC address in the received data frame is an Organizationally Unique Identifier (OUI).

In some embodiments, the modified data frame is a modified broadcast frame or a modified broadcast message.

In some embodiments, a switch ID is obtained for each of the plurality of switch devices.

In some embodiments, if the data frame is a unicast message, the step of forwarding or flooding the modified data frame to at least one switch device of the plurality of switch devices further comprising:

fetching from a part of a destination MAC address of the modified unicast message, the switch ID;

if it is determined that there is an entry associating the switch ID fetched from the part of the destination MAC address of the modified unicast message with a port number indicating a port of the source switch device in a switch table, forwarding the modified unicast message via the port of the source switch device to one switch device of the plurality of switch devices; and if it is determined that there is no entry associating the switch ID fetched from the part of the destination MAC address of the modified unicast message with a port number indicating a port of the source switch device in a switch table, flooding the modified unicast message to the plurality of switch devices.

Figure 7:
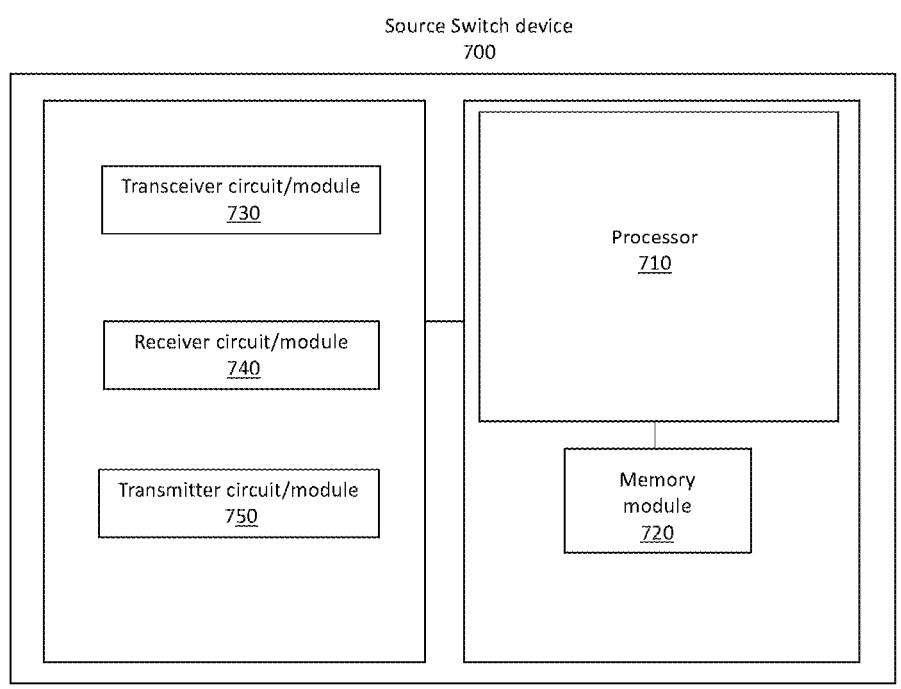
FIGS. 7-9 illustrates a block diagram of a source switch device, a transit switch device and a destination switch device respectively, according to some embodiments herein.

To perform the method described above, a source switch device 700 is provided as shown in a simplified block diagram of FIG. 7. As shown, the source switch device 700 comprises a processing circuit or a processing module or a processor 710; a memory module 720; a receiver circuit or receiver module 740; a transmitter circuit or transmitted module 750; and a transceiver circuit or transceiver module 730 which may include the transmitter circuit 750 and the receiver circuit 740. The source switch device 700 may support any radio access technology including 2G, 3G, 4G, 5G, Wifi, Wimax or a combination thereof.

The processing module/circuit 710 includes a processor, microprocessor, an application specific integrated circuit (ASIC), field programmable gate array (FPGA), or the like, and may be referred to as the "processor 710." The processor 710 controls the operation of the source switch device and its components. Memory (circuit or module) 720 includes a random-access memory (RAM), a read only memory (ROM), and/or another type of memory to store data and instructions that may be used by processor 710. In general, it will be understood that the source switch device 700 in one or more embodiments includes fixed or programmed circuitry that is configured to carry out the operations in any of the embodiments disclosed in this disclosure including the claims related to the method performed by the source switch device.

The processor 710 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 710 to carry out the operations of the source switch device 700 disclosed herein. The source switch device 700, by means of processor 710, is operative to perform the actions previously described and as presented in method claims of the source switch device.

There is also provided a computer program comprising instructions which when executed on at least one processor 710 of the source switch device 700 according to embodiments herein, cause the at least one processor 710 to carry out the method previously described.

Figure 5:
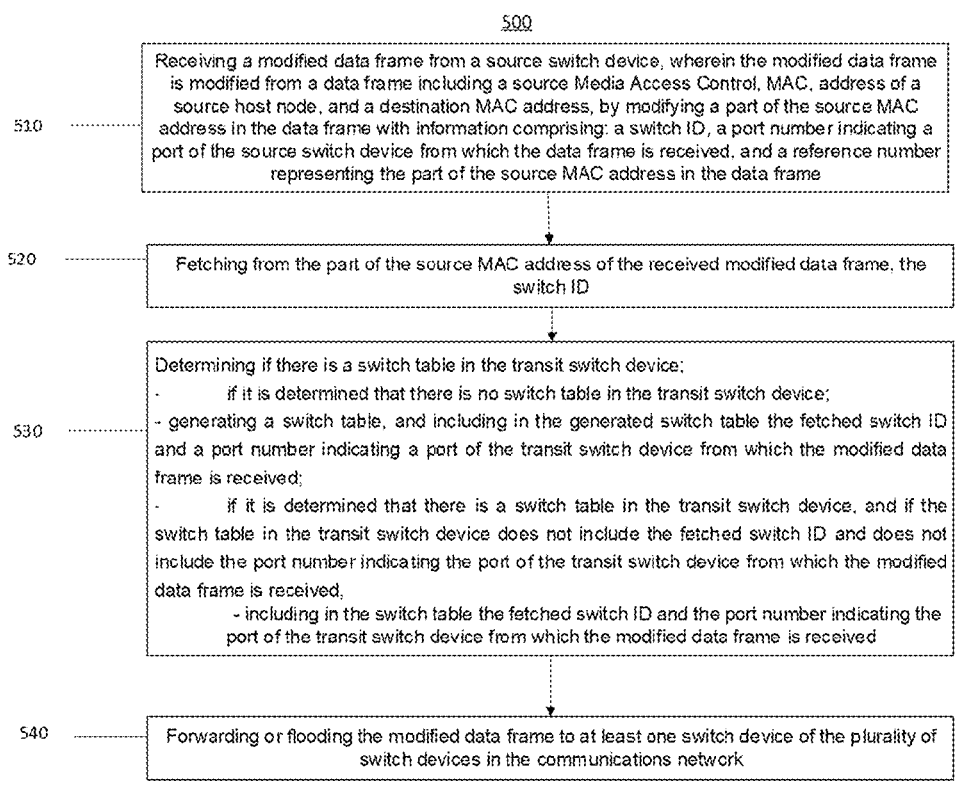
FIG. 5 is a flowchart of a method performed by a transit switch device for switching data frames, according to some embodiments of the present disclosure.

FIG. 5 is a flowchart of a method 500 performed by a transit switch device for switching data frames in a communications network, according to some embodiments of the present disclosure. The communications network comprises a plurality of switch devices including the transit switch device. The method comprises the following:

510: receiving a modified data frame from a source switch device, wherein the modified data frame is modified from a data frame including a source Media Access Control, MAC, address of a source host node, and a destination MAC address, by modifying a part of the source MAC address in the data frame with information comprising: a switch ID, a port number indicating a port of the source switch device from which the data frame is received, and a reference number representing the part of the source MAC address in the data frame;

520: fetching from the part of the source MAC address of the received modified data frame, the switch ID;

530: determining if there is a switch table in the transit switch device;

if it is determined that there is no switch table in the transit switch device;
generating a switch table, and including in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received, including in the switch table the fetched switch ID and the port number indicating the port of the transit switch device from which the modified data frame is received; and

540: forwarding or flooding, towards a destination host node, the modified data frame to at least one switch device of the plurality of switch devices.

In some embodiments, the part of the source MAC address in the data frame is an Organizationally Unique Identifier (OUI).

In some embodiments, the data frame is a unicast message, and the step of forwarding or flooding the modified data frame to at least one switch device of the plurality of switch devices further comprises:

fetching from a part of a destination MAC address of the modified unicast message, a switch ID;

if it is determined that there is an entry associating the switch ID fetched from the part of the destination MAC address of the modified unicast message with a port number indicating a port of the transit switch device in a switch table, forwarding the modified unicast message via the port of the transit switch device to one switch device of the plurality of switch devices; and if it is determined that there is no entry associating the switch ID fetched from the part of the destination MAC address of the modified unicast message with a port number indicating a port of the transit switch device in a switch table, flooding the modified unicast message to the plurality of switch devices.

Figure 8:
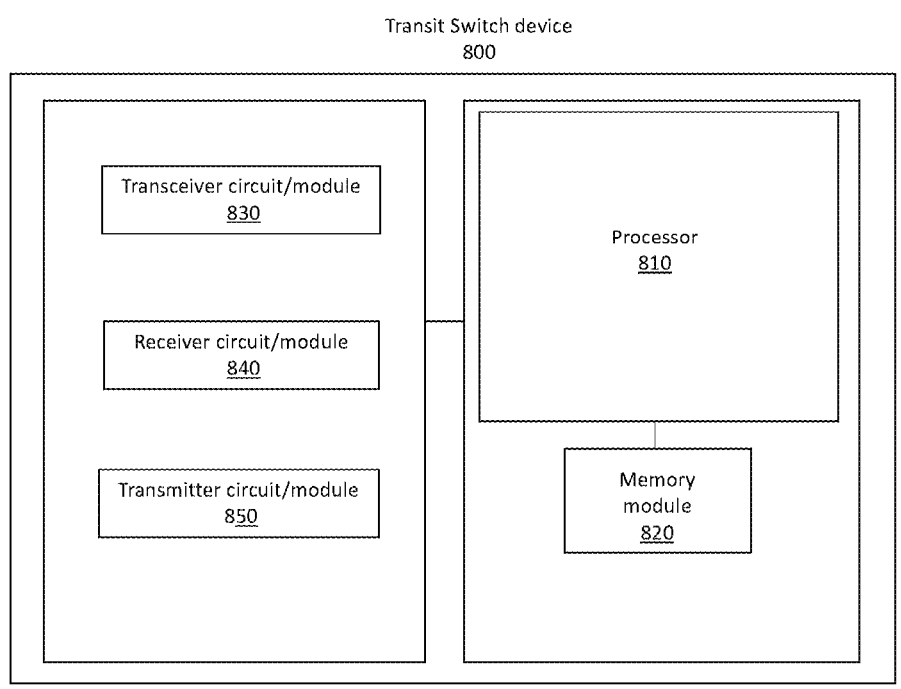

To perform the method described above, a transit switch device 800 is provided as shown in a simplified block diagram of FIG. 8. As shown, the transit switch device 800 comprises a processing circuit or a processing module or a processor 810; a memory module 820; a receiver circuit or receiver module 840; a transmitter circuit or transmitted module 850; and a transceiver circuit or transceiver module 830 which may include the transmitter circuit 850 and the receiver circuit 840. The transit switch device 800 may support any radio access technology including 2G, 3G, 4G, 5G, Wifi, Wimax or a combination thereof.

The processing module/circuit 810 includes a processor, microprocessor, an application specific integrated circuit (ASIC), field programmable gate array (FPGA), or the like, and may be referred to as the "processor 810." The processor 810 controls the operation of the transit switch device and its components. Memory (circuit or module) 820 includes a random-access memory (RAM), a read only memory (ROM), and/or another type of memory to store data and instructions that may be used by processor 810. In general, it will be understood that the transit switch device 800 in one or more embodiments includes fixed or programmed circuitry that is configured to carry out the operations in any of the embodiments disclosed in this disclosure including the claims related to the method performed by the transit switch device.

The processor 810 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 810 to carry out the operations of the transit switch device 800 disclosed herein.

The transit switch device 800, by means of processor 810, is operative to perform the actions previously described and as presented in method claims of the transit switch device.

There is also provided a computer program comprising instructions which when executed on at least one processor 810 of the transit switch device 800 according to embodiments herein, cause the at least one processor 810 to carry out the method previously described.

Figure 6:
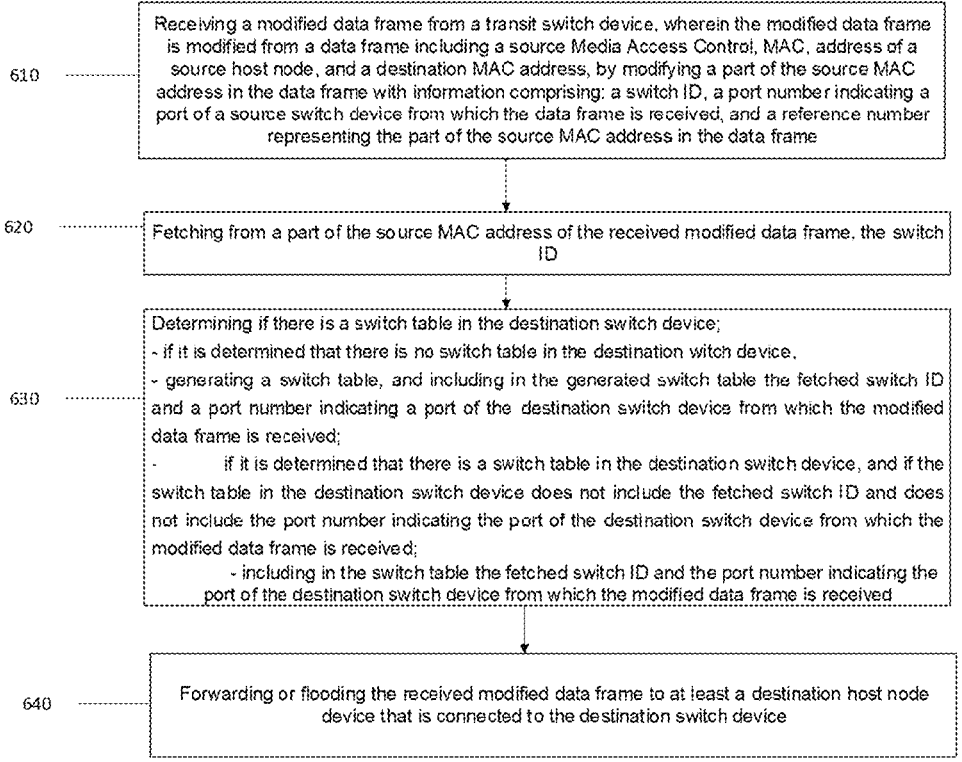
FIG. 6 is a flowchart of a method performed by a destination switch device for switching data frames, according to some embodiments of the present disclosure.

FIG. 6 is a flowchart of a method 600 performed by a destination switch device for switching data frames in a communications network, according to some embodiments of the present disclosure. The communications network comprises a plurality of switch devices. The method comprises the following:

610: receiving a modified data frame from a transit switch device, wherein the modified data frame is modified from a data frame including a source Media Access Control, MAC, address of a source host node, and a destination MAC address, by modifying a part of the source MAC address in the data frame with information comprising: a switch ID, a port number indicating a port of a source switch device from which the data frame is received, and a reference number representing the part of the source MAC address in the data frame;

620: fetching from a part of the source MAC address of the received modified data frame, the switch ID;

630: determining if there is a switch table in the destination switch device;

if it is determined that there is no switch table in the destination switch device,
generating a switch table, and including in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received;
including in the switch table the fetched switch ID and the port number indicating the port of the destination switch device from which the modified data frame is received; and

640: forwarding or flooding the received modified data frame to at least a destination host node device that is connected to the destination switch device.

Figure 9:
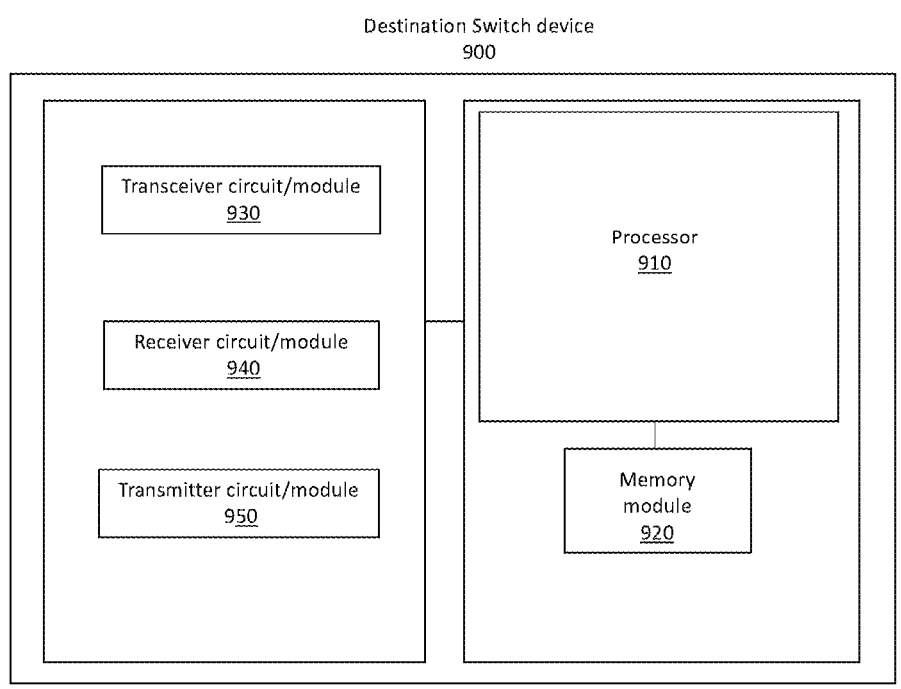

To perform the method described above, a destination switch device 900 is provided as shown in a simplified block diagram of FIG. 9. As shown, the destination switch device 900 comprises a processing circuit or a processing module or a processor 910; a memory module 920; a receiver circuit or receiver module 940; a transmitter circuit or transmitted module 950; and a transceiver circuit or transceiver module 930 which may include the transmitter circuit 950 and the receiver circuit 940. The destination switch device 900 may support any radio access technology including 2G, 3G, 4G, 5G, Wifi, Wimax or a combination thereof.

The processing module/circuit 910 includes a processor, microprocessor, an application specific integrated circuit (ASIC), field programmable gate array (FPGA), or the like, and may be referred to as the "processor 910." The processor 910 controls the operation of the destination switch device and its components. Memory (circuit or module) 920 includes a random-access memory (RAM), a read only memory (ROM), and/or another type of memory to store data and instructions that may be used by processor 910. In general, it will be understood that the destination switch device 900 in one or more embodiments includes fixed or programmed circuitry that is configured to carry out the operations in any of the embodiments disclosed in this disclosure including the claims related to the method performed by the destination switch device.

The processor 910 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 910 to carry out the operations of the destination switch device 900 disclosed herein. The destination switch device 900, by means of processor 910, is operative to perform the actions previously described and as presented in method claims of the destination switch device.

There is also provided a computer program comprising instructions which when executed on at least one processor 910 of the destination switch device 900 according to embodiments herein, cause the at least one processor 910 to carry out the method previously described.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation. As described, the embodiments herein may be applied in any wireless systems including LTE or 4G, LTE-A (or LTE-Advanced), 5G, WiMAX, WiFi, satellite communications, TV broadcasting etc. that may employ beamforming technology.

The invention claimed is:

1. A method performed by a source switch device, for switching data frames in a communications network comprising a plurality of switch devices including the source switch device; the source switch having a switch identity (switch ID); the method comprising:
receiving a data frame from a source host node that is connected to the source switch device, wherein the data frame includes a source Media Access Control (MAC) address of the source host node, and a destination MAC address;
modifying a part of the source MAC address in the received data frame with information comprising: the switch ID, a port number indicating a port of the source switch device from which the data frame is received, and a reference number representing the part of the source MAC address in the received data frame;
determining if there is a table in the source switch device;
if it is determined that there is a table in the source switch device, and if the table in the source switch device does not include the reference number and the part of the source MAC address;
including the reference number and the part of the source MAC address in an entry of the table;
if it is determined that there is no table in the source switch device;
generating a table and including in an entry of the generated table, the reference number, and the part of the source MAC address; and
forwarding or flooding, towards a destination host node, the modified data frame to at least one switch device of the plurality of switch devices.

2. The method according to claim 1, wherein, the part of the source MAC address in the received data frame is an Organizationally Unique Identifier (OUI).

3. The method according to claim 1, wherein the modified data frame is a modified broadcast frame or a modified broadcast message.

4. The method according to claim 1, wherein a switch ID is obtained for each of the plurality of switch devices.

5. The method according to claim 1, if the data frame is a unicast message, the forwarding or flooding the modified data frame to at least one switch device of the plurality of switch devices further comprising:

fetching from a part of a destination MAC address of the modified unicast message, the switch ID;

if it is determined that there is an entry associating the switch ID fetched from the part of the destination MAC address of the modified unicast message with a port number indicating a port of the source switch device in a switch table, forwarding the modified unicast message via the port of the source switch device to one switch device of the plurality of switch devices; and if it is determined that there is no entry associating the switch ID fetched from the part of the destination MAC address of the modified unicast message with a port number indicating a port of the source switch device in a switch table, flooding the modified unicast message to the plurality of switch devices.

6. A source switch device for switching data frames in a communications network comprising a plurality of switch devices including the source switch device, the source switch device having a switch identity (switch ID), the source switch device comprising a processor and a memory, and said memory containing instructions executable by said processor whereby said source switch device is operative to:

receive a data frame from a source host node that is connected to the source switch device, wherein the data frame includes a source Media Access Control (MAC) address of the source host node, and a destination MAC address;

modify a part of the source MAC address in the received data frame with information comprising: the switch ID, a port number indicating a port of the source switch device from which the data frame is received, and a reference number representing the part of the source MAC address in the received data frame;

determine if there is a table in the source switch device;

if it is determined that there is a table in the source switch device, and if the table in the source switch device does not include the reference number and the part of the source MAC address;

include the reference number and the part of the source MAC address in an entry of the table;

if it is determined that there is no table in the source switch device;

generate a table and including in an entry of the generated table, the reference number, and the part of the source MAC address; and forward or flood, towards a destination host node, the modified data frame to at least one switch device of the plurality of switch devices.

7. The source switch device according to claim 6, wherein the part of the source MAC address in the received data frame is an Organizationally Unique Identifier (OUI).

8. The source switch device according to claim 6, wherein the modified data frame is a modified broadcast frame or a modified broadcast message.

9. The source switch device according to claim 6, wherein a switch ID is obtained for each of the plurality of switch devices.

10. The source switch device according to claim 6, if the data frame is a unicast message, to forward or flood the modified data frame to at least one switch device of the plurality of switch devices, the source switch device is further operative to:

fetch from a part of a destination MAC address of the modified unicast message, the switch ID;

if it is determined that there is an entry associating the switch ID fetched from the part of the destination MAC address of the modified unicast message with a port number indicating a port of the source switch device in a switch table, forward the modified unicast message via the port of the source switch device to one switch device of the plurality of switch devices; and if it is determined that there is no entry associating the switch ID fetched from the part of the destination MAC address of the modified unicast message with a port number indicating a port of the source switch device in a switch table, flood the modified unicast message to the plurality of switch devices.

11. A transit switch device for switching data frames in a communications network comprising a plurality of switch devices including the transit switch device, wherein the transit switch device comprising a processor and a memory, and said memory containing instructions executable by said processor whereby said transit switch device is operative to:

receive a modified data frame from a source switch device, wherein the modified data frame is modified from a data frame including a source Media Access Control (MAC) address of a source host node and a destination MAC address, by modifying a part of the source MAC address in the data frame with information comprising: a switch identity (switch ID), a port number indicating a port of the source switch device from which the data frame is received, and a reference number representing the part of the source MAC address in the data frame;

fetch from the part of the source MAC address of the received modified data frame, the switch ID;

determine if there is a switch table in the transit switch device;

if it is determined that there is no switch table in the transit switch device, generate a switch table, and include in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received, include in the switch table the fetched switch ID and the port number indicating the port of the transit switch device from which the modified data frame is received; and forward or flood, towards a destination host node, the modified data frame to at least one switch device of the plurality of switch devices.

12. The transit switch device according to claim 11, wherein the part of the source MAC address in the data frame is an Organizationally Unique Identifier (OUI).

13. The transit switch device according to claim 11, if the data frame is a unicast message, to forward or flood the modified data frame to at least one switch device of the plurality of switch devices, the transit switch device is further operative to:

fetch from a part of a destination MAC address of the modified unicast message, a switch identity (switch ID);

if it is determined that there is an entry associating the switch ID fetched from the part of the destination MAC address of the modified unicast message with a port number indicating a port of the transit switch device in a switch table, forward the modified unicast message via the port of the transit switch device to one switch device of the plurality of switch devices; and if it is determined that there is no entry associating the switch ID fetched from the part of the destination MAC address of the modified unicast message with a port number indicating a port of the transit switch device in a switch table, flood the modified unicast message to the plurality of switch devices.

14. A destination switch device for switching data frames in a communications network comprising a plurality of switch devices including the destination switch device, wherein the destination switch device comprising a processor and a memory, and said memory containing instructions executable by said processor whereby said destination switch device is operative to:

receive a modified data frame from a transit switch device, wherein the modified data frame is modified from a data frame including a source Media Access Control (MAC) address of a source host node, and a destination MAC address, by modifying a part of the source MAC address in the data frame with information comprising: a switch identity (switch ID), a port number indicating a port of a source switch device from which the data frame is received, and a reference number representing the part of the source MAC address in the data frame;

fetch from the part of the source MAC address of the received modified data frame, the switch ID;

determine if there is a switch table in the destination switch device;

if it is determined that there is no switch table in the destination switch device,
generate a switch table, and include in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received,
include in the switch table the fetched switch ID and the port number indicating the port of the destination switch device from which the modified data frame is received; and forward or flood the received modified data frame to at least a destination host node device that is connected to the destination switch device.

15. The destination switch device according to claim 14, wherein the part of the source MAC address in the data frame is an Organizationally Unique Identifier (OUI).

* * * * *